May 7, 1968    A. N. SZWARGULSKI    3,381,351
METHOD OF MAKING A FUEL METERING VALVE ELEMENT
Filed Sept. 21, 1964    3 Sheets-Sheet 1

INVENTOR.
ALEX N. SZWARGULSKI
BY
AGENT

INVENTOR.
ALEX N. SZWARGULSKI
BY
AGENT

INVENTOR.
ALEX N. SZWARGULSKI
BY
AGENT

United States Patent Office 3,381,351
Patented May 7, 1968

3,381,351
METHOD OF MAKING A FUEL METERING
VALVE ELEMENT
Alex N. Szwargulski, St. Louis, Mo., assignor to ACF Industries, Incorporated, New York, N.Y., a corporation of New Jersey
Filed Sept. 21, 1964, Ser. No. 397,729
3 Claims. (Cl. 29—156.7)

ABSTRACT OF THE DISCLOSURE

The invention hereafter described relates to a method for forming a resilient tip to one end of a metallic valve element. The method relates specifically to the means for engaging the metallic valve element with a portion of the resilient material forming mold whereby an adequate sealing surface may be formed therebetween. In effect the novel form of engagement between the mold and the body is such that the body is at least partially deformed or indented in such a manner as to be depressed along a planar surface. Thus, the resilient material formed into the metallic body permits a substantially flashless joint and also forms on the resilient insert a cylindrical portion which is not intended for sealing purposes but rather is the point at which any deformation in the resilient material occurs.

---

This invention relates generally to carburetors for internal combustion engines which employ float actuated needle valves for maintaining a predetermined constant fuel level within a fuel bowl and more specifically to a novel method of molding a rubber tip on such a needle valve construction.

Float actuated needle valves for carburetors generally comprise a valve body having a metallic seat for engagement by the tapered end of a metallic needle. To prevent leakage and flooding of the carburetor, the needle and seat must be manufactured to exact tolerances and the fuel must be free from particles of foreign material which might interfere with proper seating of the needle. Also, when carburetors of this type are used on internal combustion engines employed to drive boats, automobiles, airplanes and other vehicles including small engines used in chain saws, lawn mowers, etc., engine vibration or rough travel of the vehicle may cause the float or other needle actuating structure to oscillate and open the needle valve slightly when additional fuel is not required in the fuel bowl.

To solve the problems encountered in the employment of needle valves having metallic sealing surfaces for engagement with a metallic valve seat, a number of valve seat constructions have been developed employing either rubber seat rings engageable by the tip of the needle valve or rubber tipped needle valves for engagement with a metallic seat formed in the valve body. The manufacture of rubber tipped needle valves, while being quite successful as far as use is concerned, has met with considerable difficulty in the technique of molding or otherwise forming the rubber tip on the needle valve body. Present methods of molding the rubber tip on the needle body structure are not consistent in providing a conical surface on the rubber tip which is smooth and free of irregularities throughout its length. The greatest problem in molding the rubber tip occurs with shrinkage of the rubber upon cooling after the tip has been molded. When the rubber shrinks the conical surface immediately adjacent the base of the tip may become scalloped or otherwise uneven in shape. The base or lower portion of the conical surface, therefore, cannot be used as a sealing surface because the uneven or scalloped surface would allow leakage to occur. It is obvious, therefore, that the diameter of the valve orifice would be restricted in its maximum size so that the engagement between the tip and the seat occurs well above the uneven base portion of the tip. Another serious disadvantage which occurs during the tip molding process is that air may become trapped in the form of bubbles in the rubber and will cause unevenness in the conical sealing surface. Air bubbles which may become trapped in the rubber flow downwardly into the mold and toward the base portion of the conical tip during injection of the rubber into the mold so that small pores or roughness occurs in the conical surface adjacent the base of the tip thereby preventing a proper seal at the base of the tip and also restricting the effective diameter of the valve orifice.

One method of forming a rubber tipped needle valve involves forcing the needle valve into a mold in such a manner that the exterior periphery of the needle valve is slightly coined by the mold to effect a tight seal between the mold and the needle valve. Natural or synthetic rubber or any other suitable elastomer or rubberlike material is then injected into the mold to form a needle valve tip having a generally conical configuration. The tight seal between the needle valve body and the mold effectively prevents flash from forming about the base of the conical surface of the needle tip. The elastomer tipped needle, upon being extracted from the die, is in its finished form.

It has been found by thorough testing that this method of manufacturing a rubber tipped needle provides an exterior peripheral surface about the base of the needle tip which is quite thin and which quite easily pulls away from the needle body upon shrinkage of the rubber material as discussed hereinabove. Distortion or separation between the tip and the needle may also occur when the needle is subjected to aromatic fuels at normal operating temperatures.

It has also been found, through considerable experience in molding rubber tips on carburetor needle valves, that an angle of generally 70° is generally an optimum angle for rubber tips of the size and shape required for carburetor needle valves and that an included angle of substantially 90° is optimum for establishing a tight seal between the die and the needle body to prevent the formation of flash during the molding process. Obviously, the employment of a single included angle for both the molded and coined surfaces of the needle would not be considered ideal. The ideal control of overall length of a molded synthetic rubber or resilient tip needle, however, is obtained by having the face of the needle body coming in direct contact of a flat surface of the mold. This will eliminate the variations which exist in contacting a conical surface. It has heretofore been impractical with present molding techniques to bring the needle body into contact with a flat mold surface.

It is an object of this invention to provide a novel method for molding rubber tips on needle valves.

Another object of the invention resides in the provision of a novel method of molding the rubber tip which prevents the formation of flash about the base of the needle tip.

Other objects and features of the invention will be in part apparent and in part pointed out hereinbelow.

Briefly, the invention comprises a rubber tipped needle valve, having one end thereof flared for receiving a rubber tip. In molding the rubber tip on the needle valve, the needle body is placed within a mold and a die having a shoulder formed thereon of generally 90° is brought into contact with the axial end of the needle seat, causing a very slight axial deformation of the outer ring portion of the flared needle end, thereby effecting a tight seal with the flared portion to prevent any leakage of rubber material during the molding process which would cause flash to form about the rubber tip. During the molding process a cylindrical surface formed in the die causes the molding of an external peripheral or base portion of the needle rubber tip, which is of substantial thickness, to prevent undue shrinkage of the external portion of the tip and to prevent the formation of rough areas on the needle tip sealing surface. The die is also formed with a conical cavity portion which during the molding process forms a conical surface on the tip, defining the finished dimension of the rubber tip. The thickness of the exterior peripheral portion or base portion of the rubber tip can be effectively varied simply by varying the length of the cylindrical surface portion of the mold. By varying the thickness of the external peripheral portion of the rubber tip, the distance between the metallic portion of the needle and the valve seat can be effectively varied while maintaining the included angle of the rubber tip at any desired angle.

The invention embodies other novel features, details of construction and arrangement of parts which are hereinafter set forth in the specification and claims and illustrated in the accompanying drawings, forming a part thereof wherein:

Figure 1:
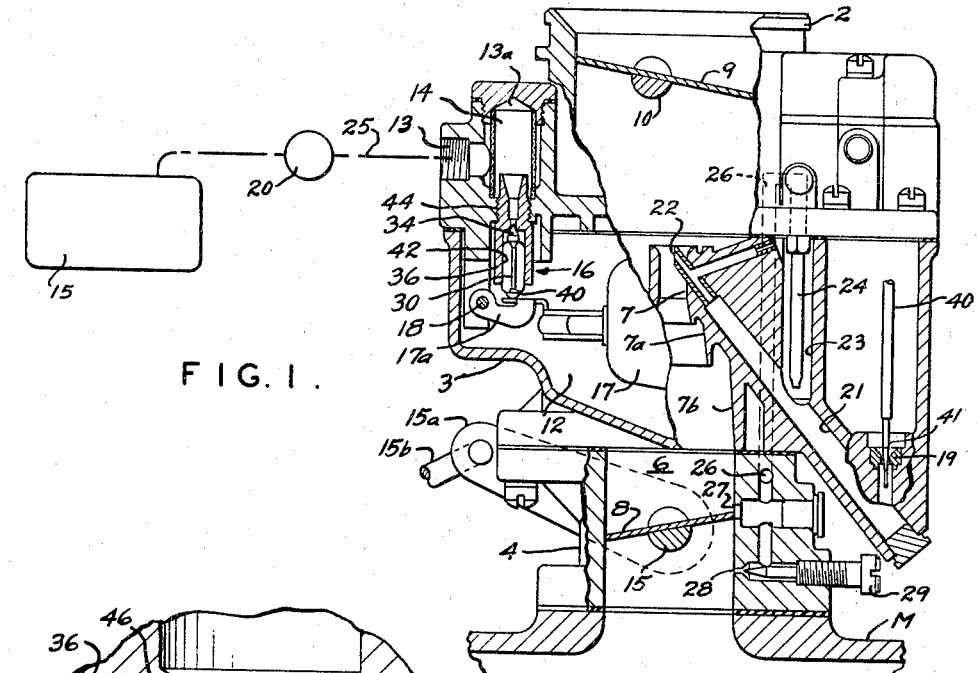
FIGURE 1 is a side elevation in several partial sections illustrating a carburetor provided with a float actuated needle valve embodying features of the invention.

Referring now to the drawings for a better understanding of the invention, a downdraft carburetor, which is one of the many types of carburetors in which the invention might be employed, is shown in FIGURE 1 as comprising an air horn section 2, a main body section 3, and a throttle outlet section 4; such sections being secured together and forming a mixture conduit 6, having a stack of venturis 7, 7a and 7b in the main body section. The carburetor is mounted on the intake manifold M of a conventional internal combustion engine N, adapted for use in driving a vehicle.

A choke valve 9, operable responsive to intake air flow, is rotatably mounted in an unbalanced manner on a valve shaft 10 in the air horn section 2, which forms the air inlet end of the mixture conduit 6. A throttle valve 8 is rotatably mounted on a shaft 15 in the outlet end of the mixture conduit 6. Throttle shaft 15 is fixed to a throttle lever 15a connected by means of a suitable linkage 15b to a manual control.

The main carburetor section 3 is provided with a fuel bowl 12, having a fuel inlet 13 provided with a screen filter 14, fixed within an inlet recess 13a. A fuel inlet valve 16 includes a needle valve 30 having a tapered point 34 in contact with a valve seat of a valve body structure 36 to control fuel flow from inlet 13 into fuel bowl 12. A float 17 carries an arm 17a pivotally mounted at 18 within the fuel bowl to actuate the needle valve 30 for maintaining a substantially constant fuel level within the bowl 12. Fuel is supplied to the bowl from a fuel tank 15 by means of a conventional engine operated fuel pump 20 which is interposed in a fuel conduit 25 leading into the fuel inlet 13.

A fuel metering orifice 19 leads from the fuel bowl 12 to an upwardly inclined main fuel passage 21, having a main fuel nozzle 22, discharging into the primary venturi 7. Fuel flow from the bowl 12 through orifice 19 into fuel passage 21 is controlled by a metering rod 40, having a stepped end 41, positioned in the metering orifice 19. Movement of rod 40 to position a different step portion in the orifice 19 provides a change in fuel flow through the orifice 19. An idle fuel system is shown as comprising a fuel well 23 leading upwardly from the main fuel passage 21. The well 23 has a metering tube 24 therein, communicating with an idle passage 26 provided with idle ports 27 and 28. An idle adjustment screw 29 is provided for the idle port 28.

Figure 2:
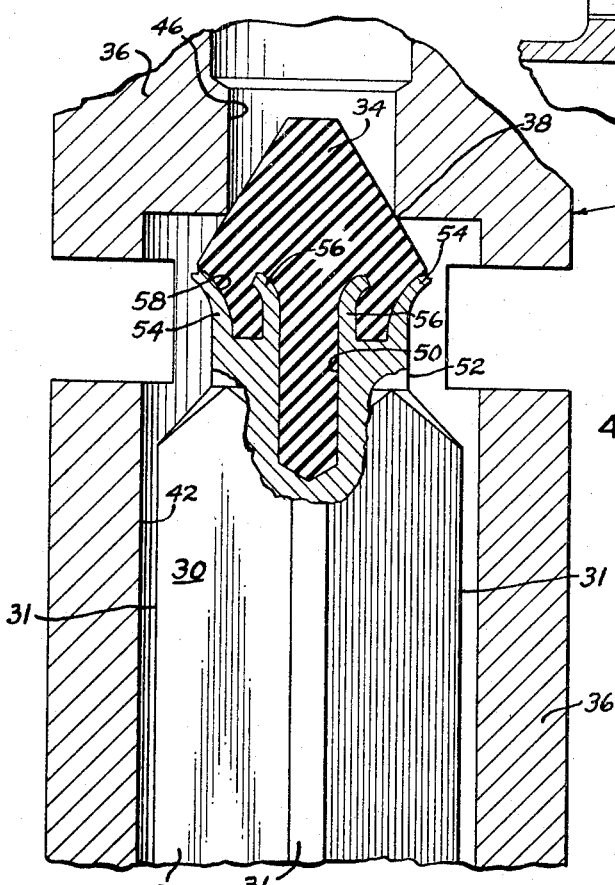
FIGURE 2 is an enlarged fragmentary longitudinal section showing the needle valve structure of FIGURE 1.
Figure 3:
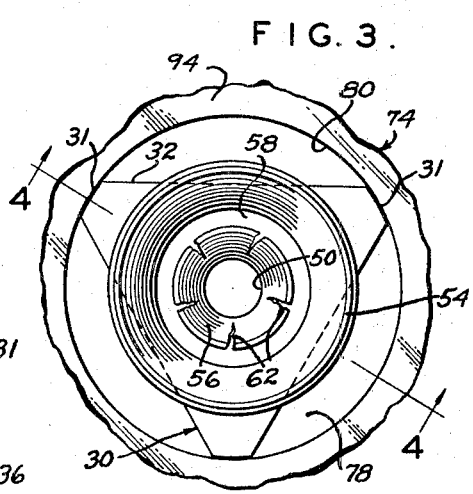
FIGURE 3 is a plan view of a needle body placed within a mold prior to the molding operation.

The fuel inlet valve 16 includes the needle 30 formed with a body 32 of noncircular cross section, as illustrated in detail in FIGURES 2 and 3. One end of the needle 30 is formed with a conical tip 34 and the other end of the needle 30 is formed with a rounded head 40, for engagement by the float arm 17a. The needle is mounted for reciprocable movement within a cylindrical bore 42 formed in the valve body 36. The upper end of the valve body 36 is formed with external threads 44, as illustrated in FIGURE 1, for detachable engagement with a threaded aperture leading through a wall of the carburetor to the inlet recess 13a.

The valve body 36 is formed with a second cylindrical bore 46, coaxially aligned with the bore 42 and of smaller diameter. The bore 46 forms a shoulder 38 with bore 42 to provide a valve seat for tip 34 of the needle 30.

The included angle of taper of the conical tip 34 of the needle 30 may vary from 60° to 90° for seating engagement against the sharp circular edge 38 of the valve seat. It has been found that conical rubber tips with included angles of less than 60° may have a tendency to become lodged within the valve orifice so that the fuel pressure must build to a quite high level before the tip is formed from the orifice. This occurrence, generally known as "corking" is undesirable because there is not a free flow of fuel at all times in response to the carburetor float level. The needle could remain lodged in the orifice a sufficient length of time for the engine to use all of the fuel in the reservoir thereby causing stalling of the engine. Conversely, as the angle of taper of the needle tip approaches 90° the seat must displace a considerable quantity of the rubber of the needle tip material during sealing, thereby requiring high pressures between the tip and the seat to affect an adequate seal. It has generally been found that an angle of approximately 70° is optimum for providing an adequate seal and eliminating the possibility of "corking."

In operation fuel is forced by fuel pump 20 from the fuel source or fuel tank 15 through fuel connections 25 into the inlet 13 of the carburetor. Fuel will flow through the screening 14 and the fuel passages 46 and 42 past the needle valve 30 when the float structure 17 of the carburetor is in a downward position to release needle 30 from its fuel passage closing position. When the fuel bowl 12 is filled to the desired predetermined level, the float lever 17a will force the needle valve 30 against the valve seat 38 and close off further flow of fuel into the carburetor. During engine operation fuel fills the fuel passage 21 to the same level as within the bowl. Air flow through the mixture conduit 6 passes through the venturi stack 7, 7a causing a low pressure area at the mouth of fuel nozzle 22. Atmospheric pressure on the fuel level in the fuel bowl 12 forces fuel up the fuel passage 21 and out of the nozzle 22 to mix with the air in the mixture conduit 6. The flow of air and fuel mixture into the manifold M of the engine is controlled in a well-known manner by the manually operated throttle valve 8.

As fuel flows from the fuel bowl 12 through the fuel passage 21 and the fuel nozzle 22, the level of fuel in the bowl is lowered with a resulting lowering of the position of the float 17. The downward movement of float arm 17a permits the fuel valve 30 to drop downwardly under the force of gravity and fuel pressure from above to permit fuel flow from the inlet 13 into the fuel bowl 12 to replenish that used by the engine.

The tip 34 of the needle valve 30 is formed of natural rubber or of a synthetic rubber material such as a fluoro-elastomer composition or a rubberlike resilient plastic material, which is not affected by contact with fuel. The use of plastic or synthetic rubberlike materials provides a more effective operation of the valve structure 36. The fuel flowing through the valve structure 36 often contains particles of dirt which can become lodged between the needle tip 34 and the valve seat 38. The presence of dirt between the valve and its seat tends to keep the valve structure open with the result that the fuel bowl 12 becomes flooded due to flow of fuel under pump pressure past the valve tip 34. Forming the valve tip of a rubber or resilient material will enable the tip to give and enclose the dirt particles and still provide a sufficiently good seal to prevent flow of fuel through the valve structure 36.

It is also advantageous to provide a needle having a rubber tip which would adapt itself to all sizes of valve seats to which it might be applied. For example, the inlet size of passage 46 varies somewhat from carburetor to carburetor depending upon its size and the amount of fuel flow desired to the carburetor. However, the passage 42 may be retained at the same size irrespective of the designed size of passage 46. In a like manner then, the needle 30 which slidingly fits within the passage 42 is retained at the same size and it is desirable that the rubber tip 34 be one which will operate successfully for all variations in the size of passage 46. This has been difficult with some previously used rubber tipped needles due to the fact that if the passage 46 of the valve structure 36 is a maximum, the needle valve tip will fit so far into the valve orifice that the seat will engage the conical surface of the needle tip 34 at a point adjacent to the region at which the rubber is fixed to the metal of the needle 30 or near the lower edge or base portion of the rubber tip 34. At this point the surface of the rubber is not resilient or as smooth as it is above the base of the conical tip. It has been found that there is in this lower region or base portion of the tip 34 an unevenness or wrinkling where the rubber is fastened to the metal of the needle. This unevenness or wrinkling is generally caused by shrinkage of the rubber material or by the trapping of air in the rubber material during the molding operation. When the rubber material is forced into the mold small air bubbles may become trapped therein and may cause roughness of the tip surface. Because the rubber flows downwardly into the mold and toward the outer periphery of the conical tip during the molding operation, the roughness will occur at the base portion of the conical surface of the tip. The roughness effectively prevents the establishment of a seal at the lower region of the conical tip and requires that the size of the valve orifice be limited. Accordingly, it is desirable that a larger rubber tip be utilized so that the effective size of the valve orifice may be increased to allow for a greater flow of fuel therethrough. To provide a needle having a larger rubber tip, however, it has heretofore been necessary to utilize a metal needle 30 of larger diameter in order to provide sufficient area to attach the tip 34. This has encountered a cost problem in the construction and design of the carburetor since a larger passage 42 for the larger needle has been required with a resulting redesign of the valve structure 36. Thus, the difficulty has been that of providing different valve structures for different sized carburetors in order to provide room for a larger needle having a large rubber tip.

In accordance with a feature of the invention, however, a rubber tip needle for a carburetor is provided, having a sufficiently large rubber tip, which is adaptable to carburetor valve structures of varying orifice diameter and which requires no enlarged design of the size of the needle body. As illustrated in FIGURES 2 and 3, a rubber tip 34 of the invention is anchored to a metal shank 32 of the needle valve by forming in the metal shank a cylindrical bore 50 and in the cylindrical end portion 52 a pair of annular rings or collars 54 and 56. The body or shank 32, as illustrated in FIGURE 3, has a triangular cross section forming longitudinal ribs 31 which center needle 30 within the bore 42. FIGURE 3 shows a plan view of the upper end of the metal shank 32 of the needle prior to attachment of the rubber tip thereon. A pair of annular collars or rings 54 and 56 are formed substantially coaxial with the common axis of the needle and the central bore 50 and are flared outwardly, as illustrated in FIGURES 2 and 3, to provide respectively for enlargement of the needle tip structure and for locking the rubber tip to the needle.

FIGURE 3 shows a plan view of the upper end of the needle 30 after the flaring operation has taken place and before the rubber tip 34 has been added. It can be seen from this view that the lip of the annular ring 54 extends outwardly a greater radial distance than the cylindrical portion 52 of the needle body. The annular ring 54, however, does not extend as far as the greatest radial dimension of the needle 30, which is limited by the diameter of the passage 42. As illustrated in FIGURE 3, the flare of ring 54 is formed intermediate the original diameter of the ring 54 and the outer extent of the rib portions 31 of the needle 30. Thus, with the greater radial extent of flare of the upper end of ring 54, a conical rubber tip having a larger base portion may be applied to the end of needle 30 than is possible if the ring 54 were restrained to the dimension of the cylindrical portion 52.

In a like manner and in accordance with a feature of this invention, the second or inner annular ring 56 is also flared outwardly and in a direction toward the outer ring 54 and provides between the rings 54 and 56 a space 58, which is partially enclosed by the flared upper ends of the ring 56. This partially enclosed space or annular region 58 is filled with the rubber material of the tip 34 by molding as described in detail hereinbelow. The upper flared end of the annular ring 56 locks the enclosed rubber in space 58 to prevent removal of the rubber tip from the needle 30.

As pointed out above, the metal needle 30 is made from metal stock having a triangular cross section as shown in FIGURE 3, the rib portions 31 of the stock in one size of needle of the type described and used successfully extend substantially 125 mills from the axis of the valve needle 30. One end of the material is formed into the cylindrical end portion 52, having an outside diameter of 150 mills and which is formed substantially tangent to the sides 32 of the needle. The annular collars 54 and 56, as well as the annular region 58, may be formed in the end of the cylindrical portion 52 in any appropriate manner. In the specific needle described, the annular collar 54 has an outside diameter of 180 mills, while the inner annular collar 56 has an outside diameter of 92 mills. The radial dimension of space 58 between the annular collars 54 and 56 is 47 mills. Bore 50 is one of 40 mills diameter and is drilled with a depth of substantially $11/64$ of an inch, although this depth is not a limiting dimension.

In one method of forming the needle body the two annular collars 54 and 56 are flared outwardly by a sleeve and a die tool in which the sleeve is placed over the cylindrical end portion 52 of the needle and has an inside diameter of the amount desired for the outside diameter of the flared portion of collar 54. A tool then is inserted into the sleeve and has surfaces which contact the tops of collars 54 and 56, and which upon applying sufficient amount of pressure to the tool, will cause the tops of the collars to be flared outwardly in the manner shown in FIGURES 2 and 3. This procedure is more of a metal drawing operation which presses out the tops of the collars and provides a conical surface to each. As illustrated in FIGURE 3, the inner collar 56 may also be formed in such a manner that cracks or fractures 62 may be formed therein. The fractures 62 may be easily formed by stressing the inner collar 56 beyond its stress limits. During the molding process the rubber material will enter the cracks or fractures 62 to further assist in locking the needle tip to the needle.

Figure 4:
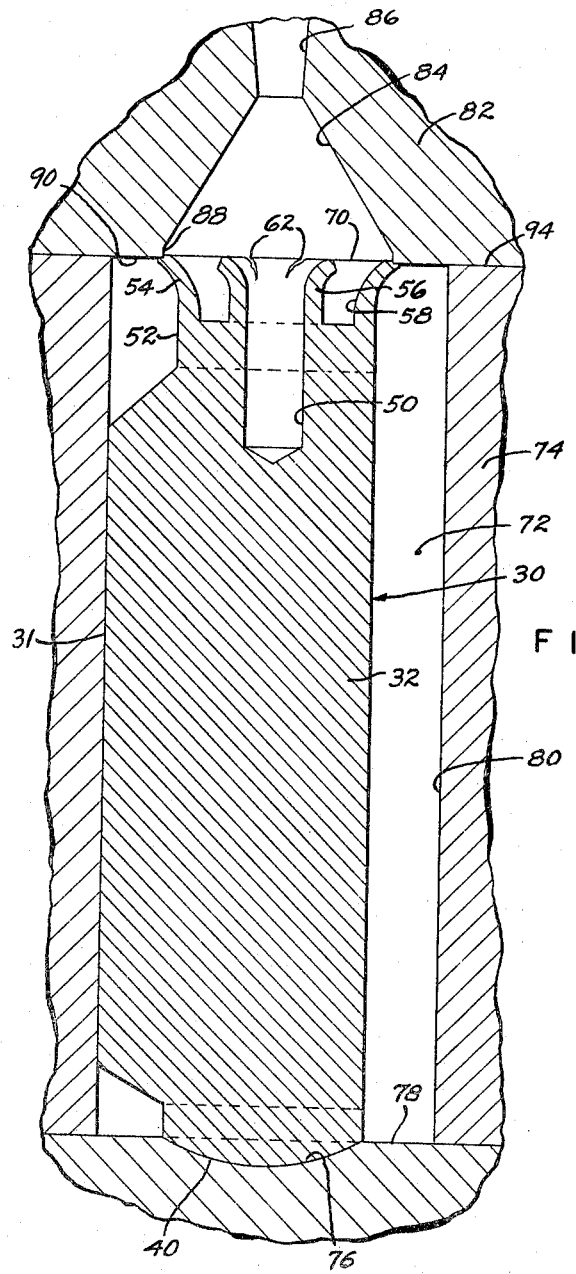
FIGURE 4 is a sectional view taken along lines 4—4 in FIGURE 3 and illustrating positioning of a die on the mold.
Figure 5:
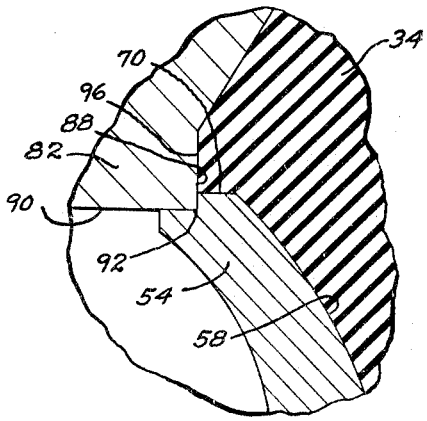
FIGURE 5 is a fragmentary sectional view of the needle valve structure of FIGURE 2, illustrating molding of the tip.
Figure 6:
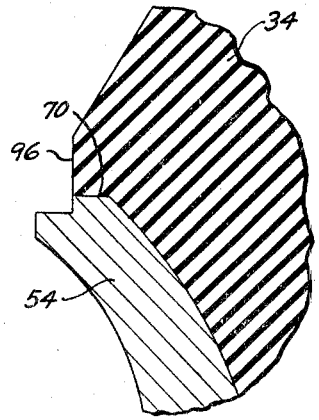
FIGURE 6 is a fragmentary sectional view of the needle valve of FIGURE 2, illustrating a portion of the rubber tip and needle flare in greater detail.
Figure 7:
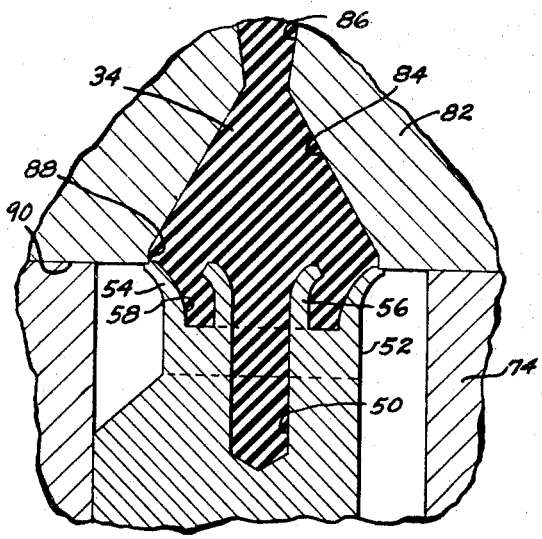
FIGURE 7 is a partial sectional view of the invention of FIGURE 4, illustrating molding of the needle tip.

As illustrated in FIGURES 4, 5 and 6 and forming an important feature of this invention, the axial outer end of the flared collar 54 on the needle valve body 32, is formed with a substantially planar surface 70, disposed in generally normal relationship with the longitudinal axis of the valve body 32. During the molding operation forming the rubber tip 34, the needle body 32 is positioned within a cavity 72 of a mold 74. The partially spherical support surface 40 at the lower extremity of the needle valve body 32 is positioned within a mating depression 76 formed in a support plate 78 of the mold 74. The interior cavity 72 of the mold 74 is defined by a cylindrical bore 80, having a close sliding fit with the ribs 31 of the needle valve body 32, to accurately align the valve body 32 within the cavity 72 of the mold 74. The partially spherical depression 76 in the plate 78 mates with and effectively supports the partially spherical surface 40 of the needle body 32 to prevent deformation of the sperical surface 40 during the molding operation.

Referring now to FIGURE 4, a die portion 82 of the mold 74 is formed with a generally conical cavity 84 defined by a conical surface of the size and shape desired for molding the conical surface of the rubber tip 34. A sprue opening in the die 82 communicates with the cavity 84 for allowing the flow of rubber material into the cavity 84 and needle structure. As illustrated in detail in FIGURE 5, a generally cylindrical surface 88 is formed at the base of the conical surface of the die and intersects with a die support surface 90 to define an angle of generally 90°, and thereby forming a sharp circular edge 92.

The axial length of the chamber 72 is slightly less than the length of the needle body 32 so that the exterior ring 54 extends slightly above an upper surface 94 of the mold 74. This will cause the surface 90 on the die 82 to contact the axial end surface 70 of the needle valve body 32 prior to seating on the support surface 94 of the mold 72. Further movement of the die 82 toward the mold 74, bringing the surfaces 90 and 94 into contact, will cause a slight deformation of the axial end surface 70 of the annular ring or collar 54. This deformation forms a tight seal between the die and the annular ring, preventing the rubber material from flowing between the die and the annular ring and forming flash. For example, assuming that the manufacturing tolerances in the length of the needle valve body is plus or minus .0025, the axial length of the mold may be .001 shorter than the lower limit of tolerance. This would assure that the depression in the annular planar surface 70 of the ring 54 will be between .001 and .006, thereby assuring that a seal between the die and the annular ring will be formed at all times to prevent the formation of flash during the molding process.

Since the die 82 is formed with a cylindrical surface 88, the finished needle seat 34 will have a cylindrical surface 96 formed thereon, which, with the conical surface of the needle tip 34, forms an annular peripheral portion of the tip 34 of considerable thickness. The thickness of the annular peripheral portion of the tip 34 effectively prevents unevenness of the lower portion of the conical surface caused by shrinkage of the molding material and effectively allows extension of the conical surface to a substantial distance above the axial limit of the needle seat body 32. By varying the axial length of the cylindrical surface 88, therefore, the distance of the conical surface relative to the end of the needle body could be effectively varied as desired.

Because of the cylindrical portion of the rubber tip, defined by the cylindrical surface 96, the tip 34 has a substantially greater volume and a substantially thicker peripheral edge portion than do tips which are formed by bringing a fully conical die into engagement with the outer periphery of a needle. Shrinkage of the rubber material will change the cylindrical surface only slightly as illustrated by the arrow in FIGURE 8. Shrinkage of the rubber material may cause deformation of the cylindrical surface 96 but the lower extremity of the conical needle tip will remain free of distortion from shrinkage.

Figure 8:
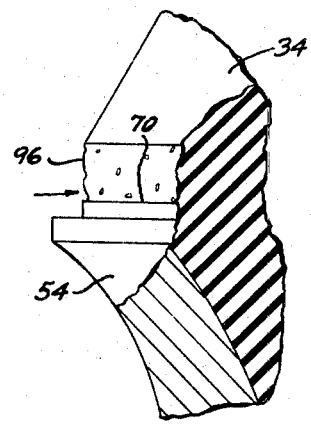
FIGURE 8 is a partial elevational view of the invention of FIGURE 7 having a portion cut away and shown in section.

Roughness of the lower extremity of the conical surface of the needle tip is also prevented by the novel construction of the needle tip 34. Air bubbles which might become entrained in the rubber material during the molding process will flow with the rubber material to the lowermost portion of the tip and, therefore, any roughness of the tip surface will occur in the cylindrical surface 96, as illustrated in FIGURE 8, thereby providing a conical sealing surface the full dimension of which may effectively be utilized as a sealing surface.

Figure 9:
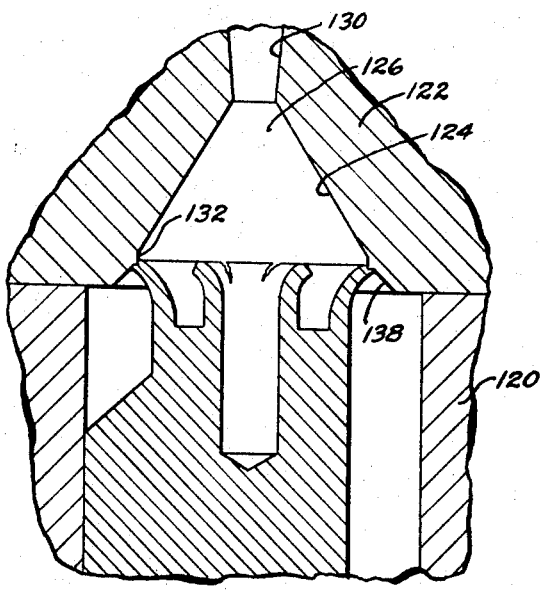
FIGURE 9 is a fragmentary view in section illustrating a further embodiment of the invention during the molding process.
Figure 10:
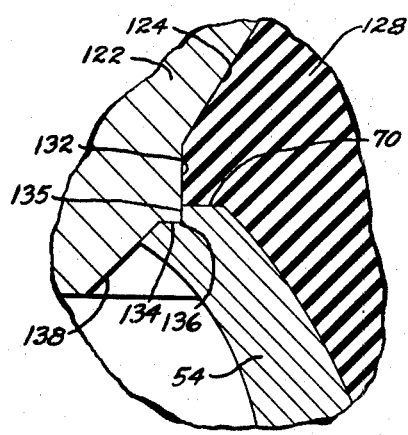
FIGURE 10 is a fragmentary view in section illustrating the invention of FIGURE 9 in detail.

Referring now to FIGURES 9 and 10, a mold 120, having a configuration essentially identical to that of the mold 74 of FIGURE 4, includes a die 122, having a conical surface 124 defining a cavity 126 for forming the needle tip 128. A sprue opening 130 is in communication with the cavity 126 to allow the injection of rubber material into the cavity 126 to form the tip 128. A small cylindrical surface 132 is formed on the interior of the die 122 and cooperates with a small annular generally planar surface 134 (FIGURE 10), also formed in the interior of the die 122, to define a relatively sharp edge 136. The die 122 is provided on its interior with a frusto-conical surface 138, having an included angle substantially greater than the included angle of the conical surface 124. During the molding operation, the die 122 will be moved into contact with the annular ring 54 on the body 32 causing an annular groove 135 of substantially 90° to be formed in the outer axial end of the annular ring 54, to establish a tight seal between the die 122 and the ring 54, to prevent the formation of flash during the molding operation. The frusto-conical surface 138 will engage the annular ring 54 slightly deforming the axial portion of the ring 54 and cooperating with the planar surface 134 to prevent movement of the flange 54 in a direction such as to reduce the diameter of the same. The cylindrical surface 132 also provides for the molding of a substantially thick annular base portion of the tip 128, which will prevent undue deformation of the exterior periphery of the tip 128 by shrinkage of the rubber material or roughness caused by trapped air in the rubber material in the manner referred to above in regard to FIGURES 4–8.

It is seen, therefore, that I have produced a novel needle valve construction and a novel method of molding the same, which allows for the formation of a tight seal between the die and the needle body to prevent the formation of flash during the molding process, and forms a substantially thick portion on the periphery of the needle tip which effectively prevents wrinkling or distortion of the conical needle tip sealing surface by shrinkage during the molding process and prevents the base portion of the conical surface from being roughened by air which might become trapped in the molding material. I have also provided structure for varying the effective length of the needle tip portion without being required to change the optimum included angle of the conical needle tip. I have also provided mold construction adapted for optimum engagement with the needle structure for the establishment of a tight seal therewith which does not require a change in the included angle of the conical tip. The invention further includes novel structure for providing an adequate seal between the die and the needle tip and yet preventing movement of the flange portion of the needle tip in a direction reducing the overall diameter of the flange. The invention, therefore, is one well adapted to attain all of the objects hereinabove set forth, together with other advantages which are obvious and inherent from the description of the apparatus itself.

It will be understood that certain features and subcombinations are of utility and may be employed without reference to other features and subcombinations.

This is contemplated by and is within the scope of the claims. As many possible embodiments may be made of the invention without departing from the spirit or the scope thereof, it is to be understood that all matters hereinabove set forth or as shown in the accompanying drawings are to be interpreted as illustrative and not in a limiting sense.

I claim:

1. A method of making a rubber tipped needle valve element having an elongated body portion having a generally frusto-conical resilient tip comprising the steps of providing a rigid needle body having tip anchoring means formed at one end thereof, placing a substantially planar end surface of said body portion into engagement with a substantially planar surface of a die for said resilient tip, causing said substantially planar die surface to axially deform an annular portion of said substantially planar surface of said body portion whereby a tight seal is formed between the die and the body, and then injecting resilient material into said die and anchoring means to form said tip, said seal preventing the formation of flash on said tip by preventing the flow of rubber between the die and the needle body.

2. A method of making a rubber tipped needle valve element having an elongated body portion having a generally frusto-conical resilient tip comprising the steps of providing a rigid body having means for anchoring said tip formed at one end thereof placing said body within a mold cavity, placing a substantially planar annular end surface of said anchoring means into engagement with a substantially planar surface of a die for said resilient tip, causing said substantially planar die surface to axially deform an annular portion of said substantially planar annular end surface of said body portion whereby a tight seal is formed between the die and the body, and then injecting resilient material into said die to form said tip, said seal preventing the formation of flash on said tip.

3. A method of making a rubber tipped needle valve element having an elongated body portion having a generally frusto-conical resilient tip comprising the steps of providing a rigid body having a socket defined by a pair of concentric flared annular rings formed at one end thereof, placing a substantially planar annular end surface of the outermost of said annular rings into engagement with a substantially planar annular surface of a die for said resilient tip, causing said substantially planar die surface to axially deform an annular portion of said substantially planar annular surface of said outermost flared ring whereby a tight seal is formed between the die and the body, and then injecting resilient material into said die to form said tip, said seal preventing the formation of flash on said tip.

References Cited

UNITED STATES PATENTS

| 3,086,750 | 4/1963 | Carlson et al. | 137—434 X |
| 3,090,108 | 5/1963 | Gifford | 29—156.7 |
| 3,090,996 | 5/1963 | Reichenbach et al. | 29—527 |

CHARLIE T. MOON, *Primary Examiner.*